C. Bartholomae,

Canteen,

№ 32,744. Patented July 9, 1861.

Witnesses: Inventor:
Wm Garrett Charles Bartholomae

UNITED STATES PATENT OFFICE.

CHAS. BARTHOLOMAE, OF NEW YORK, N. Y.

CANTEEN.

Specification of Letters Patent No. 32,744, dated July 9, 1861.

*To all whom it may concern:*

Be it known that I, CHARLES BARTHOLOMAE, of the city, county, and state of New York, have invented a new and Improved Canteen for Soldiers; and I do hereby declare that the following is a full, clear, and exact description of the same, reference being had to the annexed drawings, making a part of this specification, in which—

Figure 1:
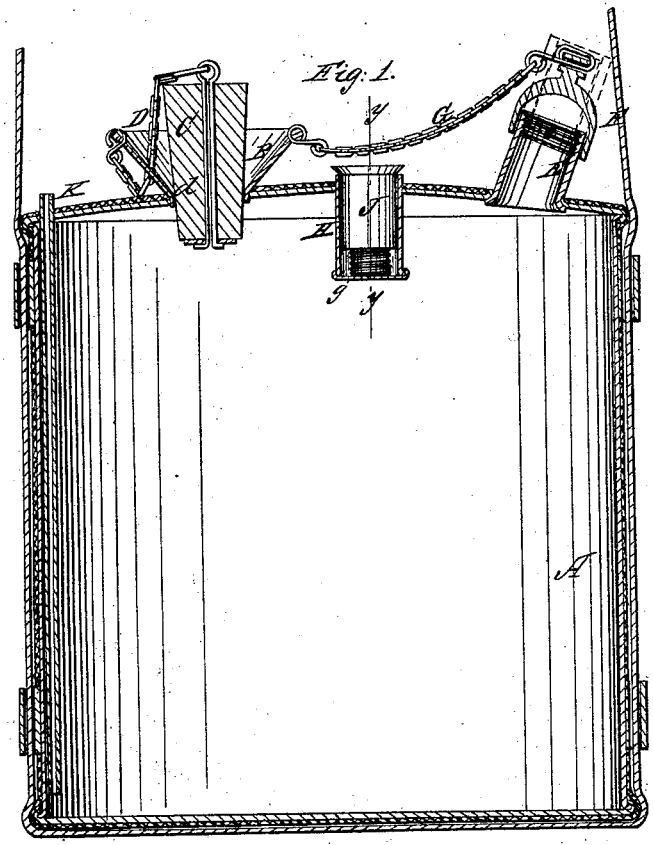
Figure 3:
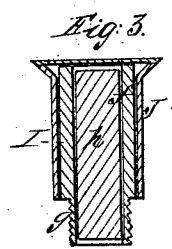
Figure 2:
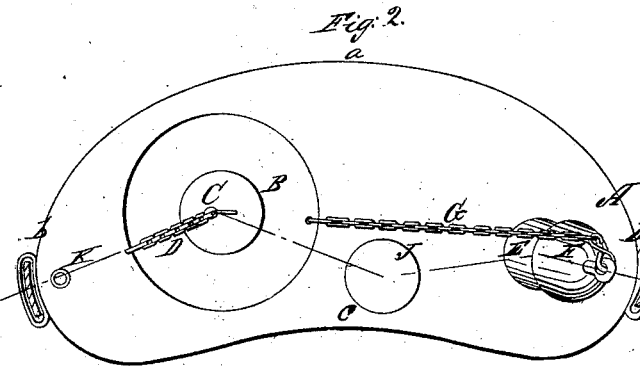
Figure 4:
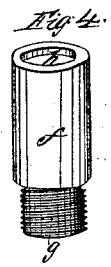

Figure 1, is a vertical section of my invention, taken in the line $x$, $x$, Fig. 2; Fig. 2, a plan or top view of the same; Fig. 3, a detached section of a portion of the same, taken in the line $y$, $y$, Fig. 1; Fig. 4, a detached perspective view of a portion pertaining to the same.

Similar letters of reference indicate corresponding parts in the several figures.

The object of this invention is to obtain a canteen which may be worn with greater facility than those of usual construction, more readily filled and more convenient to drink from, and one supplied with an efficient filtering device, which may be used whenever necessity requires.

To enable those skilled in the art to fully understand and construct my invention I will proceed to describe it.

A, represents the body of the canteen which has vertical sides but is of curved form in its horizontal section, the outer side $a$, and ends $b$, $b$, being convex, and the inner side $c$, concave, as shown clearly in Fig. 2. The body A, may be of any suitable dimensions, its capacity however will probably be equal to that of the canteens generally used.

In the top of the canteen there is made an induction opening $d$, which is encompassed by a funnel B, permanently attached to the canteen. The opening $d$, when not in use for the purpose of filling the canteen, is stopped by a cork C, which is secured by a chain D, to the canteen.

E, is a mouth tube which is attached to the top of the canteen in an inclined position, as shown in Figs. 1, and 2. The tube E, when not in use has its orifice covered by a cap F, which is secured to the canteen by a chain G. The mouth tube E, is permanently attached to the canteen and its upper end is provided with an internal screw $e$, shown in Fig. 1.

In the top of the canteen there is fitted a tube or socket H, which is designed to receive a filter I, when the latter is not required for use. This filter I, is composed of a tube $f$, having a male screw $g$, at its lower end, to fit the internal screw $e$, of the tube E. This tube $f$, has any suitable filtering medium $h$, placed in it. When it is necessary to use the filter I, the tube $f$, is secured into the mouth tube E, as shown in red in Fig. 1. To facilitate the screwing of the tube $f$, into tube E, and unscrewing it therefrom, a cap J, is employed in which the principal part of the tube $f$, is fitted, the screw portion $g$, being only exposed. The socket H, receives both the tube $f$, and its cap, and the latter serves as a protection or cover to the tube $f$, when the latter is in its socket H, see Fig. 1.

By having the induction opening $d$, provided with a funnel B, the canteen may be readily filled, and in consequence of having a separate or special mouth tube E, the latter may be made of such dimensions as to suit the mouth of the soldier which is not the case in ordinary canteens as the nozzle is much too large for the human mouth, and is necessarily made so in order to admit of the ready filling of the canteen, which is provided with one opening only.

K, is a tube which is fitted vertically in the canteen A, at one end. This tube K, extends down nearly to the bottom of the canteen and by the admission of air allows the contents of the canteen to be readily drawn through the mouth tube E.

By having the filter I, attached and arranged as shown, impure water which is often, necessarily, used may be filtered as it is drawn from the canteen, a very simple manipulation only being required to adjust it to the mouth piece E, and the canteen may be used in camp as an ordinary tea or coffee pot, performing precisely the same function, its shape admitting of its standing upright on a table or bench.

There is another important feature attending the form of the canteen, and that is, its curved shape admits of its fitting snugly to the wearer, and the swinging of the canteen is avoided. The ordinary canteens which are in the form of an oblate spheroid are continually swinging on the backs of the soldiers, especially while going through quick evolutions, so much so as not only to be very conspicuous to lookers on, but also disagreeable and embarrassing to the soldiers.

I would remark that the canteen may be constructed of tin plate and covered with cloth. This is the usual mode of construction, but I do not confine myself to any material.

I do not claim broadly a filtering device irrespective of the arrangement and mode of application herein shown and described; nor do I claim separately any of the parts in themselves considered;—but,

Having thus described my invention, what I claim as new and desire to secure by Letters Patent is—

1. The induction opening $d$, provided with a fixed funnel B, in combination with the mouth tube E, and with or without the air-tube K, when applied to a soldier's canteen, constructed of curved form in its horizontal section, substantially as and for the purpose set forth.

2. The filter I, when constructed, arranged and used in connection with the mouth tube E, of the canteen as herein shown and described.

CHARLES BARTHOLOMAE.

Witnesses:
WM. GARRETT,
M. M. LIVINGSTON.